(12) United States Patent
Yen et al.

(10) Patent No.: US 8,197,714 B2
(45) Date of Patent: Jun. 12, 2012

(54) ELECTRICALLY CONDUCTIVE COMPOSITE

(75) Inventors: Min-Yu Yen, Taitung County (TW);
Jiann-Jong Su, Miaoli County (TW);
Jen-Dong Hwang, Hsinchu (TW);
Yi-Yie Yan, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 1484 days.

(21) Appl. No.: 11/640,912

(22) Filed: Dec. 19, 2006

(65) Prior Publication Data

US 2007/0224488 A1    Sep. 27, 2007

(30) Foreign Application Priority Data

Mar. 22, 2006   (TW) ................................ 95109873 A

(51) Int. Cl.
*H01B 1/06* (2006.01)
*H01M 4/64* (2006.01)
(52) U.S. Cl. ........ 252/511; 252/500; 429/517; 429/518; 429/519; 429/520; 429/521
(58) Field of Classification Search .................. None
See application file for complete search history.

(56) References Cited

U.S. PATENT DOCUMENTS

| | | | |
|---|---|---|---|
| 6,248,467 B1 | 6/2001 | Wilson et al. | |
| 6,436,315 B2 * | 8/2002 | Butler | ............... 252/511 |
| 2002/0068210 A1 * | 6/2002 | Saito et al. | ............ 429/34 |
| 2005/0001352 A1 | 1/2005 | Ma et al. | |
| 2005/0244700 A1 * | 11/2005 | Abd Elhamid et al. | ......... 429/34 |

FOREIGN PATENT DOCUMENTS

| | | |
|---|---|---|
| TW | 399348 | 5/1987 |
| TW | 221039 B | 9/2004 |

OTHER PUBLICATIONS

Machine translation of JP 2003-206452, Osawa et al., Jan. 10, 2002.*

* cited by examiner

*Primary Examiner* — Barbara Gilliam
*Assistant Examiner* — Kwang Han
(74) *Attorney, Agent, or Firm* — Birch, Stewart, Kolasch & Birch, LLP

(57) ABSTRACT

The invention provides an electrically conductive composite having high conductivity, hermeticity, high mechanical strength, low surface roughness, lightweight, and thin profile. The composite comprises a rubber modified with vinyl ester resin. After curing in mold, the composite may serve as a bipolar plate in a fuel cell. For example, the bipolar plate is combined with a membrane electrode assembly (MEA) to form a proton exchange membrane fuel cell (PEMFC).

18 Claims, 1 Drawing Sheet

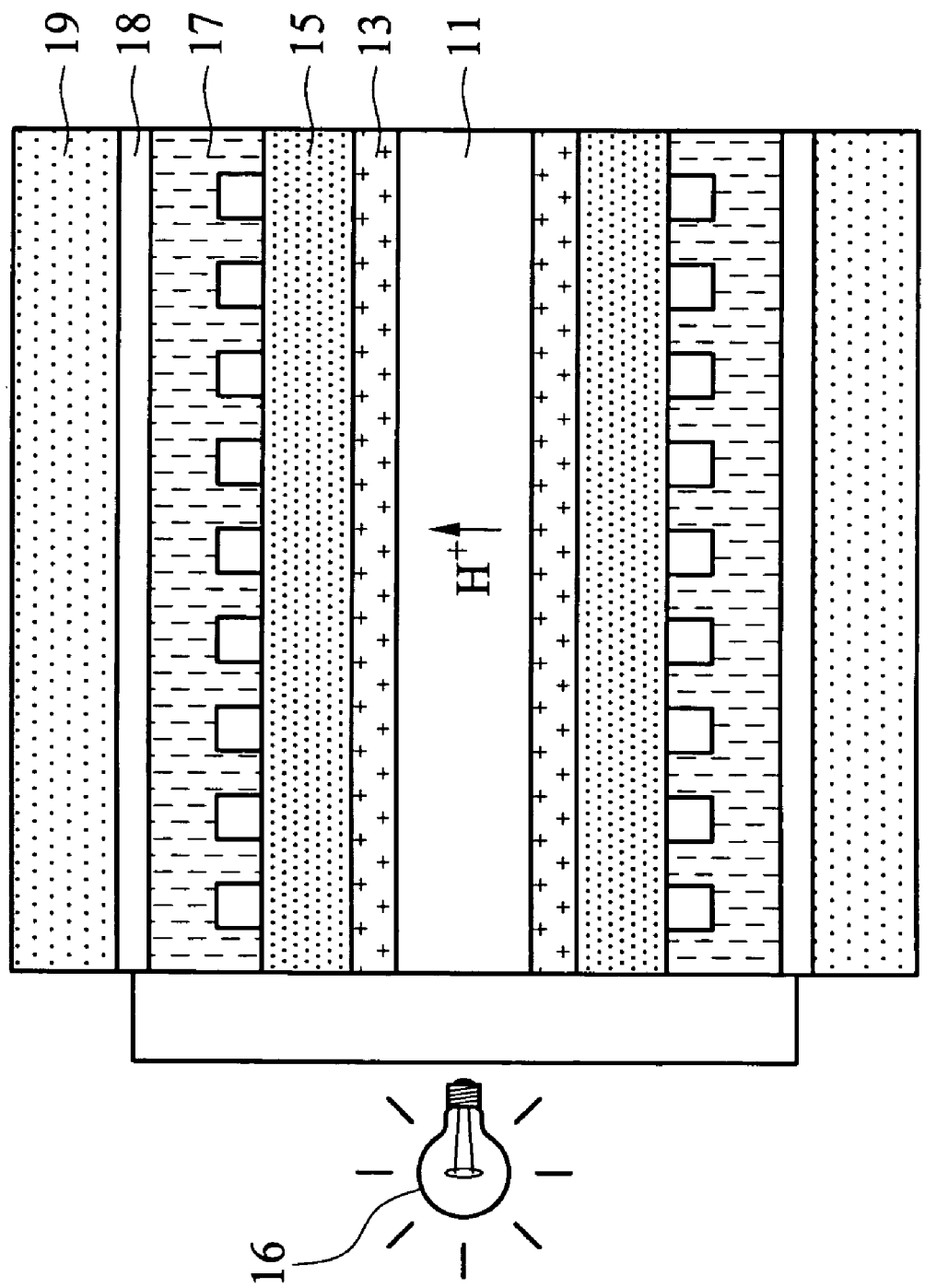

ELECTRICALLY CONDUCTIVE COMPOSITE

BACKGROUND OF THE INVENTION

1. Field of the Invention

The invention relates to an electrically conductive composite, and in particular to an electrically conductive composite serving as a bipolar plate of a fuel cell.

2. Description of the Related Art

As shown in FIG. 1, a proton exchange membrane fuel cell (PEMFC) comprises a proton exchange membrane 11 interposed between catalyst layers 13, bipolar plates 17, current collectors 18, and end plates 19. Hydrogen or recombinated air is supplied to an anode and oxygen or air is supplied to a cathode. These electrodes are separated by the proton exchange membrane 11. The anode undergoes oxidation, and the cathode undergoes reduction, respectively. When contacting the catalyst layer 13 (platinum or platinum alloy) proximate to the proton exchange membrane 11, hydrogen is decomposed to protons and electrons. The protons pass through the proton exchange membrane 11 to the cathode. Note that since the membrane 11 is a wet membrane, only the protons accompanying water molecules can pass through the membrane 11, while other gas cannot. The electrons move from the anode, through a device 16 and a bridge, to the cathode. The bridge is coupled between the cathode and the anode, and connected in series to the device 16. Oxygen is reduced by the electrons to oxide ions, and the oxide ions combine with the protons to form water molecules. Accordingly, the described reactions are electrochemical reactions.

Electrochemical PEMFCs have several advantages such as high efficiency, low pollution, and fast response. A PEMFC can be connected in series to enhance bridge voltage, or surface area of the electrodes thereof can be increased to enhance current flow. The device 16 may operate continuously when provided with a continuous supply of hydrogen and oxygen (generally air). Excluding small power systems, a PEMFC can be assigned as a power plant, a distributed power source, or a portable power source.

Bipolar plates make up the most of the volume and weight of the PEMFC, such that research and discovery of a new bipolar plate material is important for PEMFC development. The bipolar plates have multiple functions such as: distributing reaction gas into reaction area, separating different reaction gases (for example, oxygen and hydrogen), transmitting electricity and heat, and stabilizing the thin film electrodes. Because they are located at reaction areas of the PEMFC, chemical corrosion resistance and refraction are necessary for the bipolar plates, as well as higher volume utility and lower density thereof. Thus the basic properties of the PEMFC include high conductivity, hermeticity, chemical corrosion-resistance, refraction, high mechanical strength, low surface roughness, lightweight, and thin profile. The preferred bipolar plates should be easily manufacturable under various specifications, and mass productable with low raw material and process costs. Less costly bipolar plates with better properties will make PEMFC having higher market competitiveness.

Conventional bipolar plates include dense carbon plates, carbon composite plates, and metal plates; and more preferably dense graphite material for use in PEMFC. Dense graphite is expensive, and manufacturing cost of flow trench for the bipolar plates is also expensive. To reduce cost, composite material is a mainstream choice for used in fuel cells. Composite can be modified to bipolar plates for a fuel cell by changing the material ratio along with choosing a forming method such as molding or injection. Generally, the raw materials of composite are less costly chemicals. The dense carbon plate needs extra process for flow trenches, however, the composite can be directly formed with flow trenches and decreasing the cost of manufacturing. The dense carbon plate is a porous material, and filling the pores is necessary in post process which is time consuming and increasing additional cost. Otherwise, composite material is hermetic, thereby eliminating post process filling. Of these two materials, composite is a better choice for production of bipolar plates.

TW Pat. Pub. No. 399,348 discloses a method of forming bipolar plates of a fuel cell. In TW Pat. Pub. No. 399,348, a conductive material, a resin, and a hydrophilic agent are mixed. The mixture is molded under 500-4000 psi pressure and 250-500° C. to yield bipolar plates. The resin may be thermoplastic or thermoset, and the conductive material may be graphite powder, carbon black, or carbon fiber.

U.S. Pat. No. 6,436,315 discloses a composite bipolar plate of a fuel cell. A mixture of a resin and graphite powder is injected by a modified injection method, and various additives are classified and defined in patent '315.

U.S. Pat. No. 6,248,467 discloses a composite bipolar plate of a fuel cell. In patent '467, a vinyl ester resin and graphite powder are mixed, wherein the graphite powder has a particle size from 80 to 325 mesh.

U.S. Pat. Pub. No. 2005/0001352 A1 discloses a composite bipolar plate of a fuel cell. In U.S. Pat. Pub. No. 2005/0001352 A1, a vinyl ester resin and graphite powder are mixed, wherein the graphite powder has a particle size from 10 to 80 mesh.

Because the multilayer structure of the proton transfer film, the gas diffusion layer, and catalyst layer interposed between the bipolar plates, the bipolar plates receive huge flexural strain. The conventional bipolar plate without enough flexural strength is an obstacle to be overcome, and a method for improving bipolar plate flexural strength is desirable.

BRIEF SUMMARY OF THE INVENTION

To overcome the obstacle of inadequate flexural strength in conventional bipolar plates, the invention provides an electrically conductive composite, comprising: 20-40 weight percent of a block copolymer; and 60-80 weight percent of a conductive filler; wherein the block copolymer is a copolymer of a rubber and a vinyl ester resin, and the rubber has greater weight ratio than the vinyl ester.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 1 is cross section of a conventional proton exchange membrane fuel cell.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

To improve bipolar plate flexural strength, the invention utilizes a rubber reinforced resin which is block copolymerized of a higher weight ratio rubber and a vinyl ester resin. The electrically conductive composite of the invention includes 20-40 weight percent of a block copolymer and 60-80 weight percent of a conductive filler, wherein the block copolymer is a copolymer of a rubber and a vinyl ester resin, and the rubber has greater weight ratio than the vinyl ester.

The conductive filler is selected from graphite powder, carbon fiber, carbon black, coke, carbon nanotubes, or combinations thereof. The block copolymer is copolymerized in the presence of a radical initiator, 1-50 weight percent rubber, 10-60 weight percent vinyl ester resin, and 10-40 weight percent crosslinking agent. A suitable rubber includes poly butadiene, nature rubber, polyisoprene, styrene-butadiene rubber, butadiene nitrile rubber, ethylene-propylene, polychloroprene, chlorinated polyethylene, silicone, fluorocarbon, or combinations thereof; and more preferred a poly acrynitrile butadiene copolymer. The rubber has a molecular weight from 1000 to 10000, preferably from 4500 to 5500. Generally, the vinyl ester resin is a reaction product of an epoxy resin and a vinyl acid compound, having various functional groups such as bisphenol A epoxy-based methacrylate, bisphenol A epoxy-based acrylate, tetrabromo bisphenol A epoxy-based methacrylate, or phenol-novalac epoxy-based acrylate. The preferred block copolymer of the invention has two parts: bisphenol A epoxy-based resin and butadiene nitrile rubber as shown below:

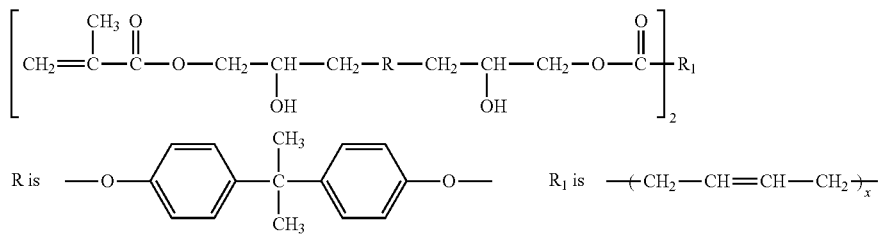

The most commonly used radical initiator includes tert-butylperoxybenzoate and peroxybenzoate. Typical crosslinking agents also serving as polymerization solvent include ethylene monomers such as a-methyl styrene monomer, chlorostyrene monomer, divinyl benzene, vinyl toluene, divinyl toluene, diallylphthalate monomer, and methylmethacrylate; acrylic nitrile monomers; or combinations thereof. The mechanical strength of the vinyl ester resin is apparently enhanced by modification of the rubber in block copolymer structure.

Several additives can be added to the electrically conductive composite of the invention, e.g. rheology modifiers or demolding agents. The most common rheology modifier is magnesium oxide. Suitable demolding agents may be fluorine wax, metal soap, hydrocarbon wax, polyethylene, amide wax, fatty acid, fatty alcohol, or fatty ester. To retain the size of the composite product after molding, shrinkage reducing agents can be added as necessary.

The bipolar plate of the invention is manufactured as described in the following. First, a solvent (also serving as a crosslink agent) is charged in a container. Second, a rubber, a vinyl ester resin, and a radical initiator are charged in the container, respectively. Additives can be charged as necessary, such as rheology modifiers or demolding agents. The mixture is stirred by vanes of a high speed stirrer for 20-30 minutes, and sealed during stirring to prevent vaporization of the solvent.

After stirring, the mixture and the conductive filler (e.g. graphite powder, carbon fiber, etc.) is charged in a bulk molding compound kneader (BMC kneader), and kneaded by masticator vanes for 30-40 minutes. Before hot embossing, a mold is heated to 140-190° C. The kneaded mixture is then appropriately weighted and charged into cavities of the mold. The mold is subsequently pressurized to 100-150 kg/cm$^2$ over 5-10 minutes to harden the kneaded mixture. After demolding by an automatic demolding system, the hardened mixture is charged in an oven at 140-190° C. for 24 hours to ensure complete hardening. The hardened article is suitable for use as electrodes, preferably as bipolar plates of a fuel cell, due to its flexural strength of about 4000 to 7000 psi, tensile strength of about 3000 to 5000 psi, conductivity of about 150 to 200 S/cm, corrosion resistance, refraction, and hermeticity. Because the porous bipolar plate has advantages such as high gas reaction rate, high power, low cost, lightweight and small size, it can be applied in conveyances, such as vehicles, ships, and aircraft motors.

EXAMPLES AND COMPARATIVE EXAMPLES

Example 1

A block copolymer of a rubber and a vinyl ester resin was kneaded with graphite powder in a solvent to form a bulk molding compound (BMC). The graphite had a weight percent of about 60-80% of the BMC. The block copolymer was polymerized in presence of a radical initiator and a demolding agent. Considering the bipolar plate properties and price, the resin used was bisphenol A epoxy-based resin, the rubber was butadiene nitrile rubber, the solvent was styrene, the radical initiator was tert-butylperoxybenzoate (TBPB), and the demolding agent was fluorine wax. The weight ratios of these materials are shown in Table 1.

TABLE 1

| Material | Example 1 | Comparative Example 1 | Comparative Example 2 |
| --- | --- | --- | --- |
| Graphite powder | 60%~80% | 60%~80% | 60%~80% |
| Rubber enforced vinyl ester resin | 12%~24% | 0 | 0 |
| Rubber | 0 | 6%~12% | 0 |
| Vinyl ester resin | 0 | 6%~12% | 12%~24% |
| Styrene monomer | 8%~16% | 8%~16% | 8%~16% |
| TBPB | 1 phr~3 phr | 0 | 1 phr~3 phr |
| Fluorine wax | 2 phr~6 phr | 0 | 2 phr~6 phr |

Note:
The abbreviation "phr" is "parts per parts hundred resin".
The resin is rubber enforced vinyl ester resin in Example 1, and vinyl ester resin in Comparative Examples 1 and 2. For example, 1 phr fluoride wax means 1 part of fluoride wax, based on 100 parts resin.

The invention provides a molding method for Example 1:
First, styrene was charged into a container. Second, a rubber enforced vinyl ester resin (40% of a styrene monomer), TBPB, and fluorine wax were charged in the container, respectively. The mixture in the container was stirred by vanes of a high speed stirrer for 20-30 minutes, and sealed during stirring to prevent vaporization of styrene. The mixture and graphite powder were then charged in a bulk molding compound kneader (BMC kneader), and kneaded by masticator vanes for 30-40 minutes. Before hot embossing, a mold was heated to 140-190° C. The kneaded mixture was then appropriately weighted and charged into cavities of the mold. The mold was subsequently pressurized to 100-150 kg/cm$^2$ for 5-10 minutes to harden the kneaded mixture. After demolding by an automatic demolding system, the hardened mixture was charged in an oven at 140-190° C. for 24 hours to ensure complete hardening. The composite property of Example 1 is shown in Table 2.

Comparative Example 1

A blend of a rubber and a vinyl ester resin was kneaded with graphite powder in a solvent to form a bulk molding compound (BMC). The graphite had a weight percent of about 60-80% of the BMC, and the rubber had a weight percent of about 6-12% of the BMC, respectively. In view of cost, the rubber was butadiene nitrile rubber, the resin was bisphenol A epoxy-based resin, and the solvent was styrene. The weight ratios of these materials are shown in Table 1.

The molding method for Comparative Example 1 is described in the following.

First, styrene was charged into a container. Second, butadiene nitrile rubber and bisphenol A epoxy-based resin were charged in the container, respectively. The mixture in the container was stirred by vanes of a high speed stirrer for 20-30 minutes, and sealed during stirring to prevent vaporization of styrene. The mixture and graphite powder were then charged in a bulk molding compound kneader (BMC kneader), and kneaded by masticator vanes for 30-40 minutes. Before hot embossing, a mold was heated to 140-190° C. The kneaded mixture was then appropriately weighted and charged into cavities of the mold; The mold was subsequently pressurized to 100-150 kg/cm$^2$ for 5-10 minutes to harden the kneaded mixture. After demolding by an automatic demolding system, the hardened mixture was charged in an oven at 140-190° C. for 24 hours to ensure complete hardening. The composite property of Comparative Example 1 is shown in Table 2.

Comparative Example 2

A vinyl ester resin was kneaded with graphite powder in a solvent to form a bulk molding compound (BMC). The graphite had a weight percent of about 60-80% of the BMC, and the vinyl ester had a weight percent of about 12-24% of the BMC, respectively. A radical initiator and a demolding agent was added to the vinyl ester resin in the solvent. In view of cost, the vinyl ester resin was bisphenol A epoxy-based resin, the solvent was styrene, the radical initiator was TBPB, and the demolding agent was fluorine wax. The weight ratios of these materials are shown in Table 1.

The molding method for Comparative Example 2 is described in the following.

First, a solvent was charged into a container. Second, bisphenol A epoxy-based resin, TBPB, and fluorine wax were charged in the container, respectively. The mixture in the container was stirred by vanes of a high speed stirrer for 20-30 minutes, and sealed during stirring to prevent vaporization of styrene. The mixture and graphite powder were then charged in a bulk molding compound kneader (BMC kneader), and kneaded by masticator vanes over 30-40 minutes. Before hot embossing, a mold was heated to 140-190° C. The kneaded mixture was then appropriately weighted and charged into cavities of the mold. The mold was subsequently pressurized to 100-150 kg/cm$^2$ over 5-10 minutes to harden the kneaded mixture. After demolding by an automatic demolding system, the hardened mixture was charged in an oven at 140-190° C. for 24 hours to ensure complete hardening. The composite property of Comparative Example 2 is shown in Table 2.

TABLE 2

| Properties | Example 1 | Comparative Example 1 | Comparative Example 2 |
| --- | --- | --- | --- |
| Tensile strength (psi) | 3450 | 3230 | 3120 |
| Flexural strength (psi) | 6100 | 5200 | 4200 |
| Refraction (° C.) | 200 | 200 | 200 |
| Conductivity(S/cm) | 150 | 150 | 150 |
| Corrosion resistance in HCl of pH 0 ($\mu$A/cm$^2$) | <1 | <1 | <1 |
| Density | 1.57 | 1.65 | 1.62 |
| Hermiticity | good | good | good |

Regarding tensile strength, refraction, conductivity, corrosion resistance, density, and hermiticity, Table 2 shows that the block copolymer of a rubber and a vinyl ester resin of the invention can be applied as bipolar plates. Particularly when comparing the flexural strength, Example 1 (block copolymer) is higher than Comparative Example 1 (blend) and Comparative Example 2 (pure vinyl ester resin) of about 100-200 psi.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electrically conductive composite, comprising:
   20-40 weight percent of a block copolymer; and
   60-80 weight percent of a conductive filler;
   wherein the block copolymer is a copolymer of a rubber and a vinyl ester resin, and the rubber has greater weight ratio than the vinyl ester.

2. The electrically conductive composite as claimed in claim 1, wherein the conductive filler comprises graphite powder, carbon fiber, carbon black, coke, carbon nanotubes, or combinations thereof.

3. The electrically conductive composite as claimed in claim 1, wherein the block copolymer is copolymerized in the presence of a radical initiator, and comprises:
   1 to 50 weight percent of a rubber;
   10 to 60 weight percent of a vinyl ester resin; and
   10 to 40 weight percent of a crosslinking agent.

4. The electrically conductive composite as claimed in claim 3, wherein the radical initiator comprises tert-butylperoxybenzoate or peroxybenzoate.

5. The electrically conductive composite as claimed in claim 3, wherein the rubber comprises poly butadiene, natural rubber, polyisoprene, styrene-butadiene rubber, butadiene nitrile rubber, ethylene-propylene, polychloroprene, chlorinated polyethylene, silicone, fluorocarbon, or combinations thereof.

6. The electrically conductive composite as claimed in claim 3, wherein the rubber is poly acrylonitrile butadiene copolymer.

7. The electrically conductive composite as claimed in claim 5, wherein the rubber has a molecular weight of about 1000 to 10000.

8. The electrically conductive composite as claimed in claim 7, wherein the rubber has a molecular weight of about 4500 to 5500.

9. The electrically conductive composite as claimed in claim 3, wherein the vinyl ester resin has functional groups comprising bisphenol A epoxy-based methacrylate, bisphenol A epoxy-based acrylate, tetrabromo bisphenol A epoxy-based methacrylate, or phenol-novalac epoxy-based acrylate.

10. The electrically conductive composite as claimed in claim 3, wherein the crosslinking agent is a vinyl monomer which comprises a-methyl styrene monomer, chlorostyrene monomer, divinyl benzene, vinyl toluene, divinyl toluene, diallylphthalate monomer, methylmethacrylate, or acrylic nitrile monomer, or combinations thereof.

11. The electrically conductive composite as claimed in claim 1, further comprising a rheology modifier or a demolding agent.

12. The electrically conductive composite as claimed in claim 11, wherein the rheology modifier comprises magnesium oxide.

13. The electrically conductive composite as claimed in claim 11, wherein the demolding agent comprises fluorine wax, metal soap, hydrocarbon wax, polyethylene, amide wax, fatty acid, fatty alcohol, or fatty ester.

14. The electrically conductive composite as claimed in claim 1, wherein the electrically conductive composite has flexural strength of about 4000 to 7000 psi.

15. The electrically conductive composite as claimed in claim 1, wherein the electrically conductive composite has tensile strength of about 3000 to 5000 psi.

16. The electrically conductive composite as claimed in claim 1, wherein the electrically conductive composite has conductivity of about 150 to 200 S/cm.

17. The electrically conductive composite as claimed in claim 1, wherein the electrically conductive composite is an electrode.

18. The electrically conductive composite as claimed in claim 1, being a bipolar plate of a proton exchange membrane fuel cell.

* * * * *